United States Patent [19]
Kitamura et al.

[11] Patent Number: 5,216,524
[45] Date of Patent: Jun. 1, 1993

[54] COMPLETE-CONTACT TYPE IMAGE SENSOR

[75] Inventors: Koichi Kitamura; Hidenori Mimura; Kazuo Yamamoto; Yasumitsu Ohta; Kazuyoshi Sai, all of Kawasaki, Japan

[73] Assignee: Nippon Steel Corporation, Tokyo, Japan

[21] Appl. No.: 525,021

[22] Filed: May 18, 1990

[30] Foreign Application Priority Data

May 18, 1989 [JP] Japan ................................. 1-125336

[51] Int. Cl.⁵ .............................................. H04N 1/04
[52] U.S. Cl. ..................................... 358/483; 358/482; 250/208.1
[58] Field of Search ............... 358/482, 483, 494, 496, 358/213.11, 213.12, 213.13; 250/208.1; 357/30 Q

[56] References Cited

U.S. PATENT DOCUMENTS

| | | | |
|---|---|---|---|
| 4,792,671 | 12/1988 | Masaki et al. | 250/208.1 |
| 4,940,888 | 7/1990 | Nagata | 250/208.1 |
| 5,060,040 | 10/1991 | Saika et al. | 358/494 |

Primary Examiner—Stephen Brinich
Assistant Examiner—Thomas L. Stoll
Attorney, Agent, or Firm—Wenderoth, Lind & Ponack

[57] ABSTRACT

A complete-contact type image sensor includes matrix-driven sensor elements arranged on a light transmitting substrate. Both input contact members connected with the sensor elements at their input side and output contact members connected with the sensor elements at their output side are formed at one same side on the light transmitting substrate. By virtue of this arrangement, the sensor elements and an original are brought into close contact, thereby improving the MTF (Modulation Transfer Function) and reducing the width of the light transmitting substrate.

8 Claims, 6 Drawing Sheets

COMPLETE-CONTACT TYPE IMAGE SENSOR

BACKGROUND OF THE INVENTION

1. Field of the Invention

The present invention relates to an image sensor for use in a small size facsimile device the like, and more particularly, to a complete-contact type image sensor capable of reading an original without reducing its size.

2. Description of the Prior Art

Since a contact type image sensor is capable of reading an original without using a reducing optical system, it has a shorter optical path and the sensor itself can be miniaturized. Therefore, sure a sensor is widely used in such reading apparatuses as small size facsimile device and bar code readers.

Among contact type image sensors in the prior art, there is one which uses, instead of a reducing optical system, an actual-size optical system represented by a SELFOC lens system, thereby forming an image on the sensor elements. Alternately, in order to lower the cost of the contact type image sensor, there has been developed a contact type image sensor of a system in which the SELFOC lens is not used, but instead the sensor elements are adapted to be brought into close contact with the original for reading an image. Hereinafter, the contact type image sensor of such a system will be denoted a "complete-contact type image sensor".

A complete-contact type image sensor includes a glass substrate, sensor elements formed on the glass substrate, input contact members connected with the sensor elements at their input side, output contact members connected with the sensor elements at their output side, driving ICs for driving the sensor elements, a light source disposed in the rear of the sensor elements, a roller to press an original against the sensor elements, and a casing for housing the sensor elements and the like. The input contact members are provided by patterning on the glass substrate set to one side and the output contact members are provided by patterning thereon set to the other end portion and the sensor elements are formed between both the contact members (Japanese Laid-open Patent Publication No. 62-126665).

A light beam emitted from the light source is reflected by the original and introduced into the sensor elements to be converted into electric signals. The driving ICs sequentially drive a large number of the sensor elements formed on the glass substrate through the output contact members and input contact members and read the electric signals photoelectrically converted by the sensor elements.

The complete-contact type image sensor (hereinafter to be also denoted simply as a "sensor") is desired to be arranged such that the distance between the original and the sensor elements is kept as small as possible because the resolution deteriorates if the original is held apart from the surface of the sensor elements. In the prior art sensor, the sensor elements are formed virtually in the center on the glass substrate and the input contact members and the output contact members are formed at opposite side end portions on the glass substrate with the sensor elements therebetween. In such a prior art sensor, there are formed protruded portions on the glass substrate at both its side end portions due to the presence of the contact members with the sensor elements disposed between these protrusions. Hence, if the width of the glass substrate is small, it is difficult to bring an original into close contact with the sensor elements. There has therefore been a problem with the prior art small-sized complete-contact type image sensor is that its MTF (Modulation Transfer Function) is rather inferior.

Further, since the input contact members and the output contact members are formed apart at opposite side end portions on the glass substrate in the prior art complete-contact type image sensor, if the distance between the input contact members and the output contact members is small, the roller comes into contact with holders covering the contact members and the like when the roller operates to bring an original into the close contact with the sensor elements. Therefore, in the prior art complete-contact type image sensor, it has been necessary to use a relatively wider glass substrate to space the input contact members and the output contact members sufficiently apart from each other, and this has made it difficult to miniaturize the module of the total sensor elements including both the contact members.

SUMMARY OF THE INVENTION

The present invention has been made in view of the described situation. Accordingly, it is an object of the present invention to provide a complete-contact type image sensor capable of bringing the sensor elements and an original into close contact.

According to a first aspect of the present invention, there is provided a photoelectric transducer receiving information recorded in a record medium as an optical signal for converting the optical signal into an electric signal to thereby output the electric signal, comprising a substrate, a plurality of sensor elements arranged on the substrate for converting the optical signal into the electric signal, a matrix circuit for time-divisionally extracting the electric signal from each of element groups into which the sensor elements are divided, first conductors provided for each element group of the matrix circuit for leading out the output signal from the matrix circuit, first electrodes connected with each of the first conductors, the first electrodes being disposed physically closer to the matrix circuit than to the sensor elements, second conductors provided for each element group of the sensor elements for transferring a driving pulse to each sensor element, the driving pulse for causing the electric signal to be taken out from each sensor element of the element group toward the side of the first electrode, second electrodes connected with each of the second conductors and disposed at the same side as the first electrode on the substrate, and transport means provided above the substrate in confrontation with the sensor elements for allowing a record medium to be transported sandwiched between the same and the substrate.

According to a second aspect of the present invention, in a photoelectric transducer according to the first aspect, a group of electrodes formed of the first and second electrodes are arranged at the side where a record medium is inserted between the transport means and the substrate.

According to a third aspect of the present invention, in a photoelectric transducer according to the second aspect, the transducer further includes thermocompression-bonded conductive seals for connection with each of the electrodes arranged in the group of electrodes.

According to a fourth aspect of the present invention, there is provided a photoelectric transducer receiving information recorded in a record medium as an optical signal for converting the optical signal into an electric signal to thereby output the electric signal, comprising a substrate, a plurality of sensor elements arranged on the substrate for converting the optical signal into the electric signal, a matrix circuit for time-divisionally extracting the electric signal from each of element groups into which the sensor elements are divided, first conductors provided for each element group of the matrix circuit for leading out the output signal from the matrix circuit, first electrodes connected with each of the first conductors, a group of first electrodes formed of an assembly of the first electrodes, second conductors provided for each element group of the sensor elements for transferring a driving pulse to each sensor element without crossing with the first electrodes, the driving pulse for causing the electric signal to be taken out from each sensor element of the element group toward the side of the first electrode, second electrodes connected with each of the second conductors and disposed at the same side as the first electrode on the substrate with respect to the sensor elements, a group of second electrodes formed of an assembly of the second electrodes, and transport means provided above the substrate in confrontation with the sensor elements for allowing a record medium to be transported sandwiched between the same and the substrate.

According to a fifth aspect of the present invention, in a photoelectric transducer according to the fourth aspect, a group of electrodes formed of the first and second electrodes are arranged at the side where a record medium is inserted between the transport means and the substrate.

According to a sixth aspect of the present invention, in a photoelectric transducer according to the fifth aspect, the transducer further includes thermocompression-bonded conductive seals for connection with each of the electrodes arranged in the group of electrodes.

According to a seventh aspect of the present invention, there is provided an image sensor for converting an optical signal into an electric signal, comprising a substrate, a plurality of sensor elements arranged on the substrate for converting the optical signal into the electric signal, a matrix circuit for time-divisionally extracting the electric signal from each of element groups into which the sensor elements are divided, first conductors provided for each element group of the matrix circuit for leading out the output signal from the matrix circuit, first electrodes connected with each of the first conductors, the first electrodes being disposed physically closer to the matrix circuit than to the sensor elements, second conductors provided for each element group of the sensor elements for transferring a driving pulse to each sensor element, the driving pulse for causing the electric signal to be taken out from each sensor element of the element group toward the side of the first electrode, and second electrodes connected with each of the second conductors and disposed at the same side as the first electrode on the substrate.

According to an eighth aspect of the present invention, there is provided an image sensor for converting an optical signal into an electric signal, comprising a substrate, a plurality of sensor elements arranged on the substrate for converting the optical signal into the electric signal, a matrix circuit for time-divisionally extracting the electric signal from each of element groups into which the sensor elements are divided, first conductors provided for each element group of the matrix circuit for leading out the output signal from the matrix circuit, first electrodes connected with each of the first conductors, a group of first electrodes formed of an assembly of the first electrodes, second conductors provided for each element group of the sensor elements for transferring a driving pulse to each sensor element without crossing with the first electrodes, the driving pulse for causing the electric signal to be taken out from each sensor element of the element group toward the side of the first electrode, second electrodes connected with each of the second conductors and disposed at the same side as the first electrode on the substrate with respect to the sensor elements, and a group of second electrodes formed of an assembly of the second electrodes.

According to the first, second, third, and seventh aspects of the present invention, since the electrodes are arranged on the side closer to the matrix circuit, the output lines can be made shorter. Therefore, it is possible to extract a weak signal with small attenuation.

Further, according to the fourth, fifth, sixth, and eighth aspects of the present invention, since the input and output lines are arranged so as to not to cross each other, there is no risk of the output signal picking up the input signal as noise.

DESCRIPTION OF THE PREFERRED EMBODIMENTS

A first embodiment of the present invention will be described below with reference to FIG. 1 to FIG. 6.

Figure 1:
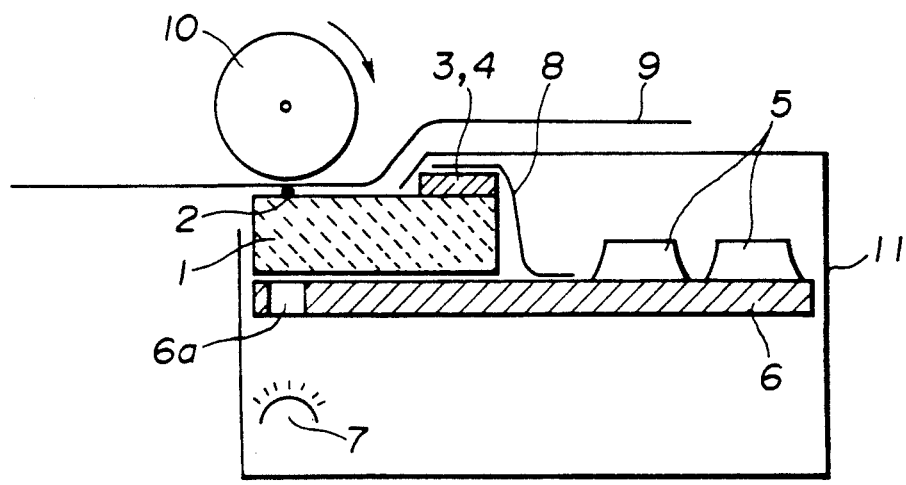
FIG. 1 is a schematic sectional view showing the structure of a complete-contact type image sensor as a first embodiment of the present invention.
Figure 3:
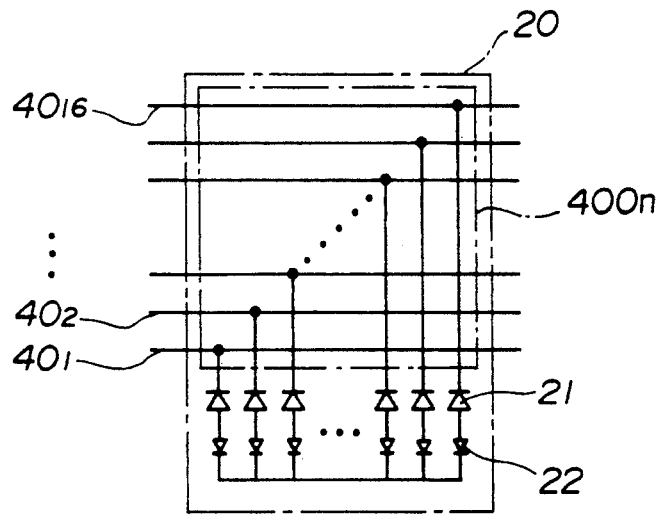
FIG. 3 is a detailed drawing of a sensor block of the same.
Figure 2:
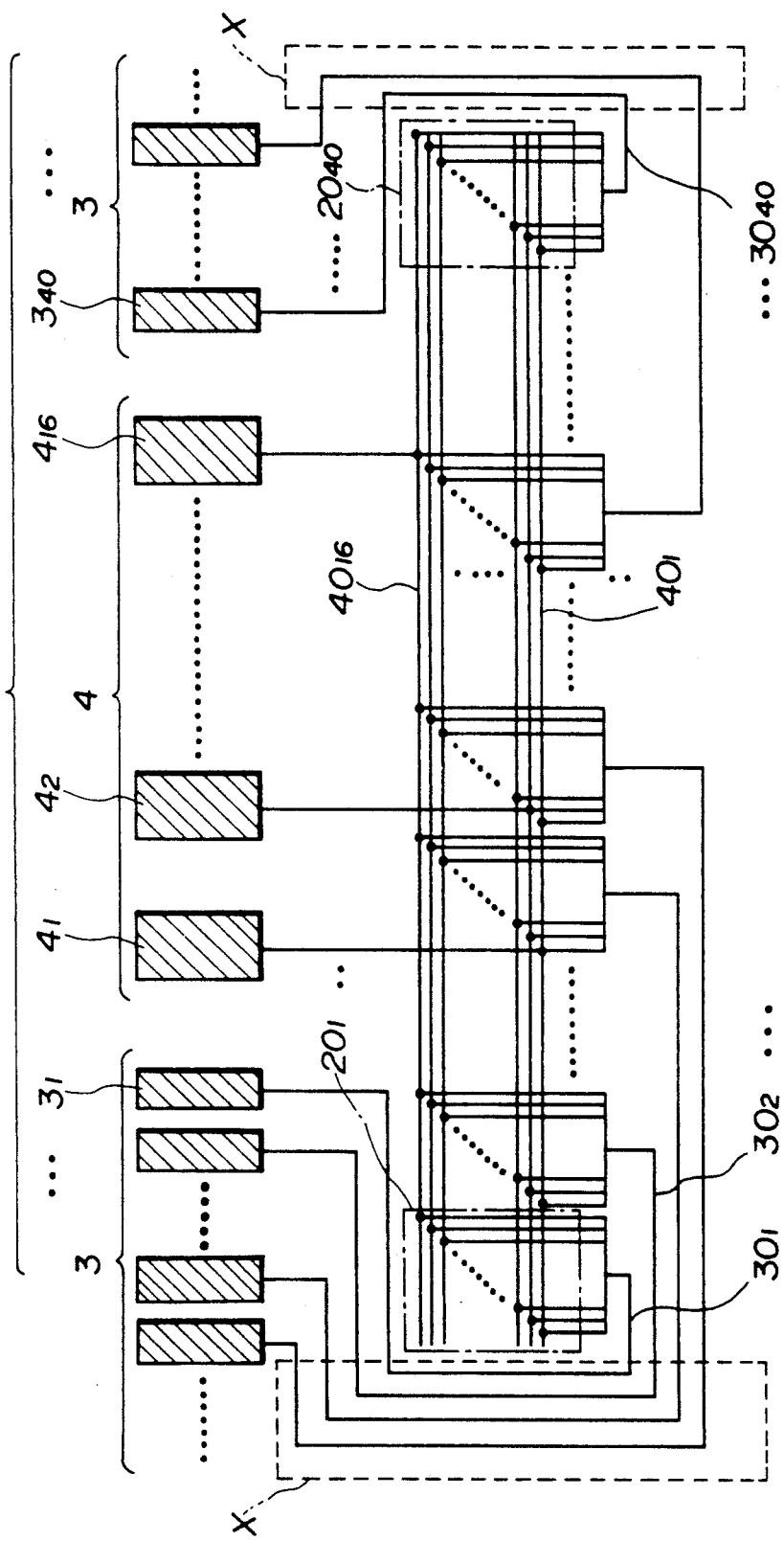
FIG. 2 is a schematic connection diagram of the same.
Figure 4:
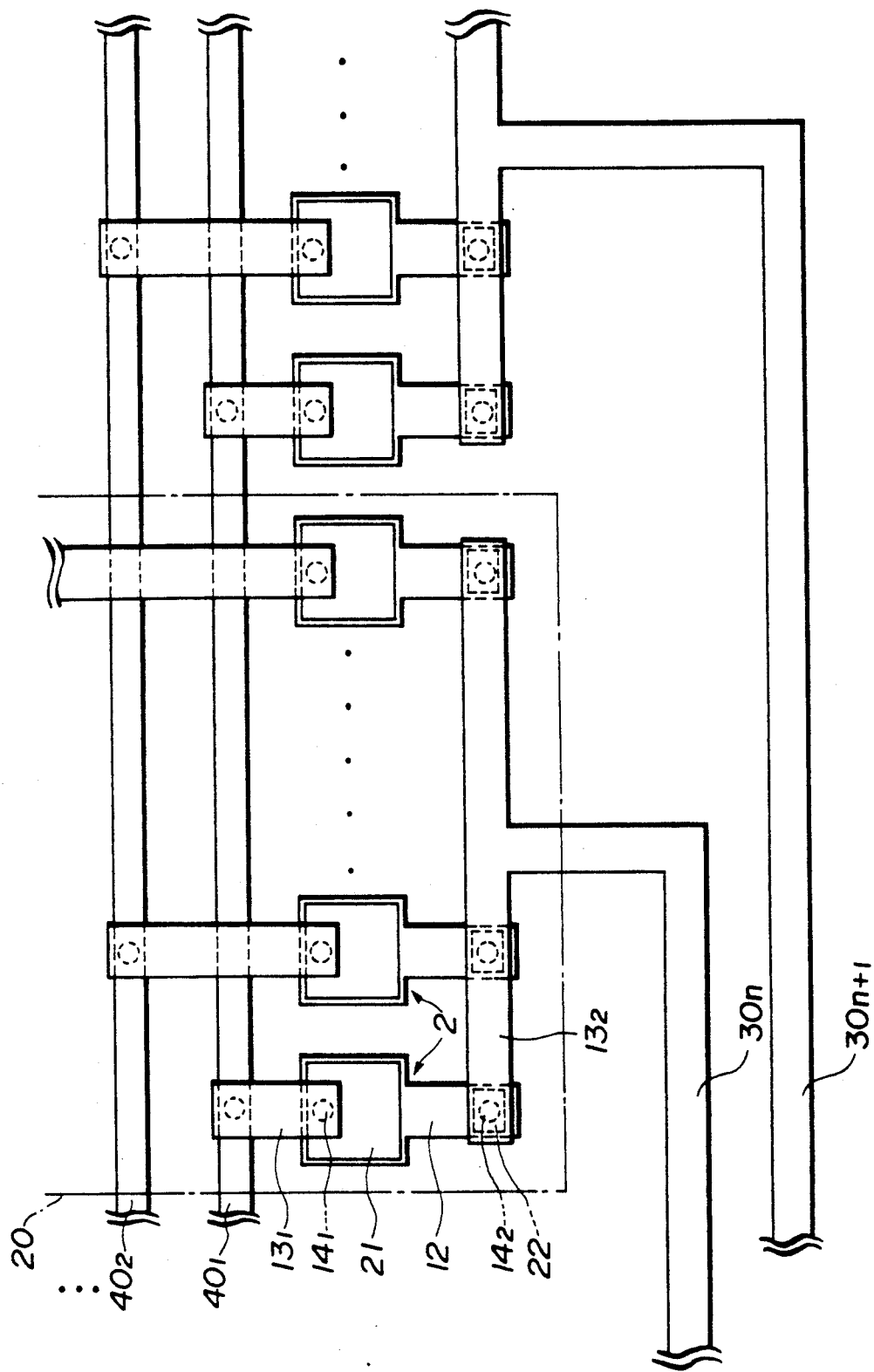
FIG. 4 is a circuit diagram showing a connecting pattern of sensor elements of the same.

FIG. 1 is a schematic sectional view showing the structure of a complete-contact type image sensor as the first embodiment of the present invention, FIG. 2 is a schematic connection diagram of the same, FIG. 3 is a detailed drawing of a sensor block of the same, and FIG. 4 is a circuit diagram showing a connecting pattern of the sensor elements of the same.

The complete-contact type image sensor of the first embodiment includes a glass substrate 1 as a light transmitting substrate, sensor elements 2 formed on the glass substrate 1 for converting an optical signal into an electric signal, input contact members (second electrodes) $3_{1-40}$ connected with the sensor elements at their input side for inputting an externally applied driving pulse for driving the sensor element, output contact members (first electrodes) $4_{1-16}$ connected with the sensor elements 2 at their output side for outputting the electric signal, a circuit board 6 supporting driving ICs 5 for driving the sensor elements 2 mounted thereon, a light source 7 disposed in the rear of the circuit board 6, thermocompression-bonded conductive seals 8 for connecting contact members $3_{1-40}$ and $4_{1-16}$ with the driving ICs 5, a roller (transport means) 10 for pressing an original (record medium) 9 against the sensor elements 2, and a casing 11 for housing the sensor elements 2 and other components. On the glass substrate 1, there are disposed 40 sensor blocks (group of elements) 20, each being comprised of 16 sensor elements 2. Further, for matrix-driving the sensor elements 2, 40 input contact members 31-40 are formed connected with the input side of the sensor elements 2 and with 40 input line electrodes (second conductors) $30_{1-40}$, and 16 output contact members $4_{1-16}$ are formed connected with the output side of the sensor elements 2 and with 16 output line electrodes (first conductors) $40_{1-16}$. Each of the sensor elements 2 is constituted, as shown in FIG. 3, of a photodiode 21 and a blocking diode 22 connected back-to-back in series. The photodiode 21 and the blocking diode 22 constituting the sensor element 2 are formed, as shown in FIG. 4, on a common lower electrode 12 with their center axis aligned and are respectively electrically connected with upper electrodes $13_1$ and $13_2$ through contact holes $14_1$ and $14_2$ made in a later described insulating layer. Reference numeral $400_n$ denotes a matrix circuit.

Figure 5:
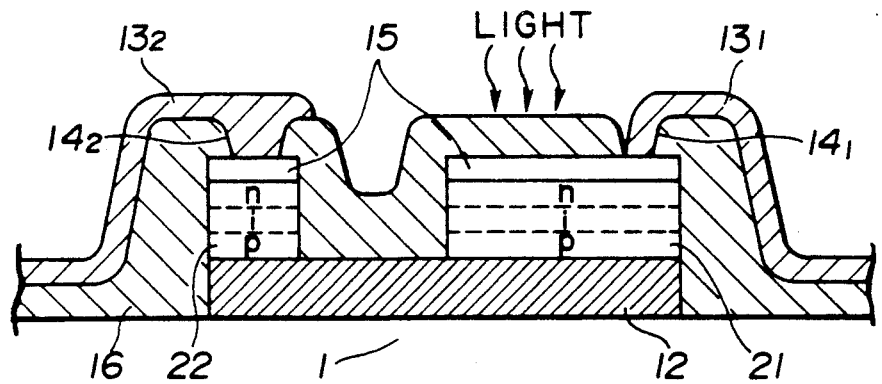
FIG. 5 is a schematic sectional view of the sensor element.

FIG. 5 is a schematic sectional view of a sensor element. The sensor element 2 of the present embodiment includes a lower electrode 12 formed on the glass substrate 1, a photodiode 21 and a blocking diode 22 formed on the lower electrode 12, an upper electrode $13_1$ for extracting electric charges stored in the photodiode 21, and an upper electrode $13_2$ for driving the blocking diode 22. As shown in FIG. 5, the photodiode 21 is formed of a p-i-n structure at the right-hand end portion on the lower electrode 12 and the blocking diode 22 is formed of a p-i-n similar structure at the left-hand end portion on the lower electrode 12. Over each of the diodes 21 and 22, there is formed a transparent conductive film 15 of ITO (Indium Tin Oxide) or the like, and the top of the transparent conductive film 15 is connected with the upper electrodes $13_1$, $13_2$ through contact holes $14_1$, $14_2$ made in the insulating layer 16. The insulating layer is provided for insulating the sensor elements 2 from each other.

A light beam emitted from the light source 7 is passed through a slit $6a$ made in the circuit board 6 and reflected by the original 9 to be introduced into the sensor elements 2 and photoelectrically converted into electric signals. The driving ICs 5, sequentially drive the total of 640 the sensor elements 2 through the input contact members $3_{1-40}$ and the 16 output contact members $4_{1-16}$ and read information stored on the sensor elements 2.

In contrast with the complete-contact type image sensor of the prior art in which the input contact members $3_{1-40}$ and the output contact members $4_{1-16}$ are disposed at their respective side end portions on the glass substrate, the input contact members $3_{1-40}$ in the complete-contact type image sensor of the present embodiment are led around to the side of the output contact members $4_{1-16}$ through the input line electrodes $30_{1-40}$ as shown in FIG. 2, so that a group of contact members (group of electrodes) 500 formed of a group of the output contact members (group of the first electrodes) 4 and a group of the input contact members (group of the second electrodes) 3 is disposed at one side end portion on the glass substrate 1. That is, the protrusion formed on the glass substrate 1 by both the contact members $3_{1-40}$ and $4_{1-16}$ is only present at one side end portion on the glass substrate 1 from where the original 9 is inserted as shown in FIG. 1. Thus, in the present embodiment, there is no protrusion existing on the glass substrate 1 at the side from where the original 9 is discharged. Therefore, even if the width of the glass substrate 1 is small, it is possible to bring the original 9 into close contact with the sensor element 2 by means of the roller 10, thereby preventing MTF (Modulation Transfer Function deterioration). If the output contact members $4_{1-16}$ are led around to the opposite side, stray capacitance on the output side becomes significant, resulting in the generation of noises in the circuits and deterioration in the S/N ratio. However, since the input contact members $3_{1-40}$ are led around to the opposite side in the present embodiment, the S/N ratio suffers no deterioration.

Further, since the original 9 and the sensor element 2 can be brought into close contact even if the width of the glass substrate 1 is small, it becomes possible to miniaturize the module of the total sensor elements inclusive of both the contact members $3_{1-40}$ and $4_{1-16}$. According to experiments conducted by the present inventors, while the width of the module of the total sensor elements inclusive of both the contact members of the prior art was 12.5 mm, it has been reduced to 6 mm wide (with a reading length of 80 mm in accordance with the present invention).

Further, since the width of the glass substrate 1 is smaller, it becomes possible to obtain a larger number of glass substrates 1 from one sheet of material glass and the circuit board 6 can also be made smaller. In addition, since the input contact members $3_{1-40}$ and the output contact members $4_{1-16}$ are arranged at one side on the glass substrate 1, the work for connecting the contact members $3_{1-40}$ and $4_{1-16}$ with the driving ICs 5 using the thermocompression-bonded conductive seals 8 is made easier and the yield rate of the products is improved. According to the present embodiment, the cost can be reduced to less than half that of the sensor of the prior art.

Figure 6:
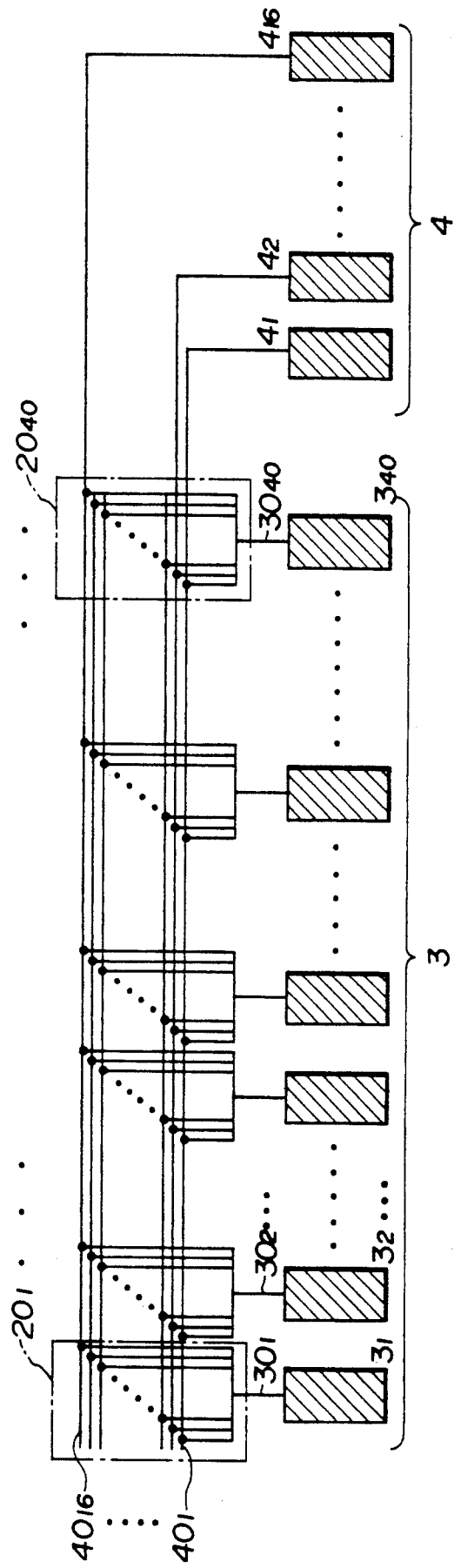
FIG. 6 is a drawing showing a variation of the embodiment of FIG. 1.

FIG. 6 is a drawing showing a variation of connection diagram of the first embodiment. In the above described embodiment, the output contact members $4_{1-16}$ were connected with the output line electrodes 40 virtually at their center and disposed between the input contact members $3_{1-40}$. In the present variation, however, the output contact members $4_{1-16}$ are connected with the output line electrodes $40_1$ to $40_{16}$ at their right-hand end and disposed at the right-hand side of the input contact members $3_{1-40}$. By virtue of this arrangement, there are produced no led-around portions of the input contact members $3_{1-40}$ as shown in FIG. 2 (the portions X encircled by dotted line in FIG. 2) and, hence, the stray capacitance becomes smaller.

Figure 7:
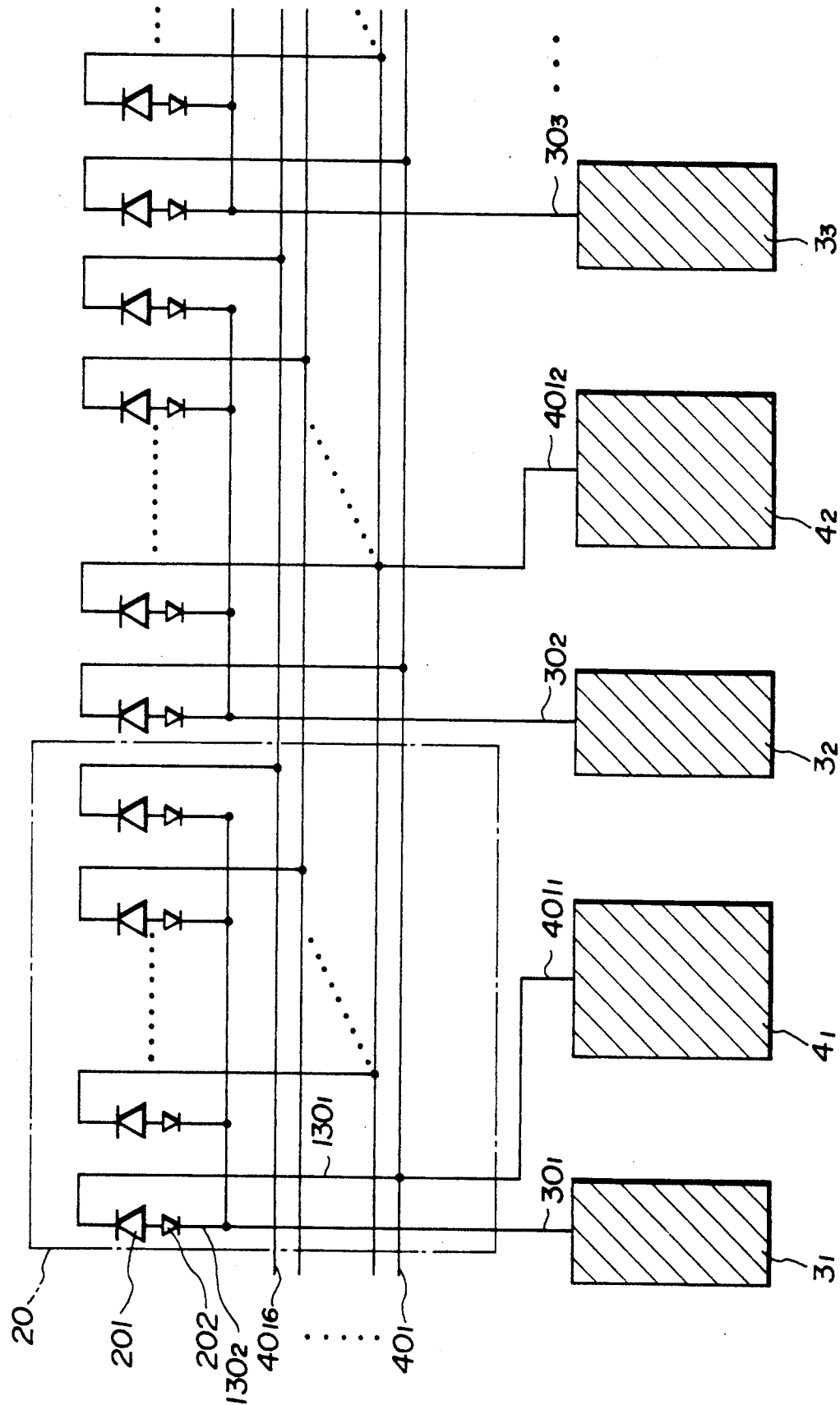
FIG. 7 is a detailed drawing of sensor blocks of a complete-contact type image sensor as a second embodiment of the present invention.
Figure 8:
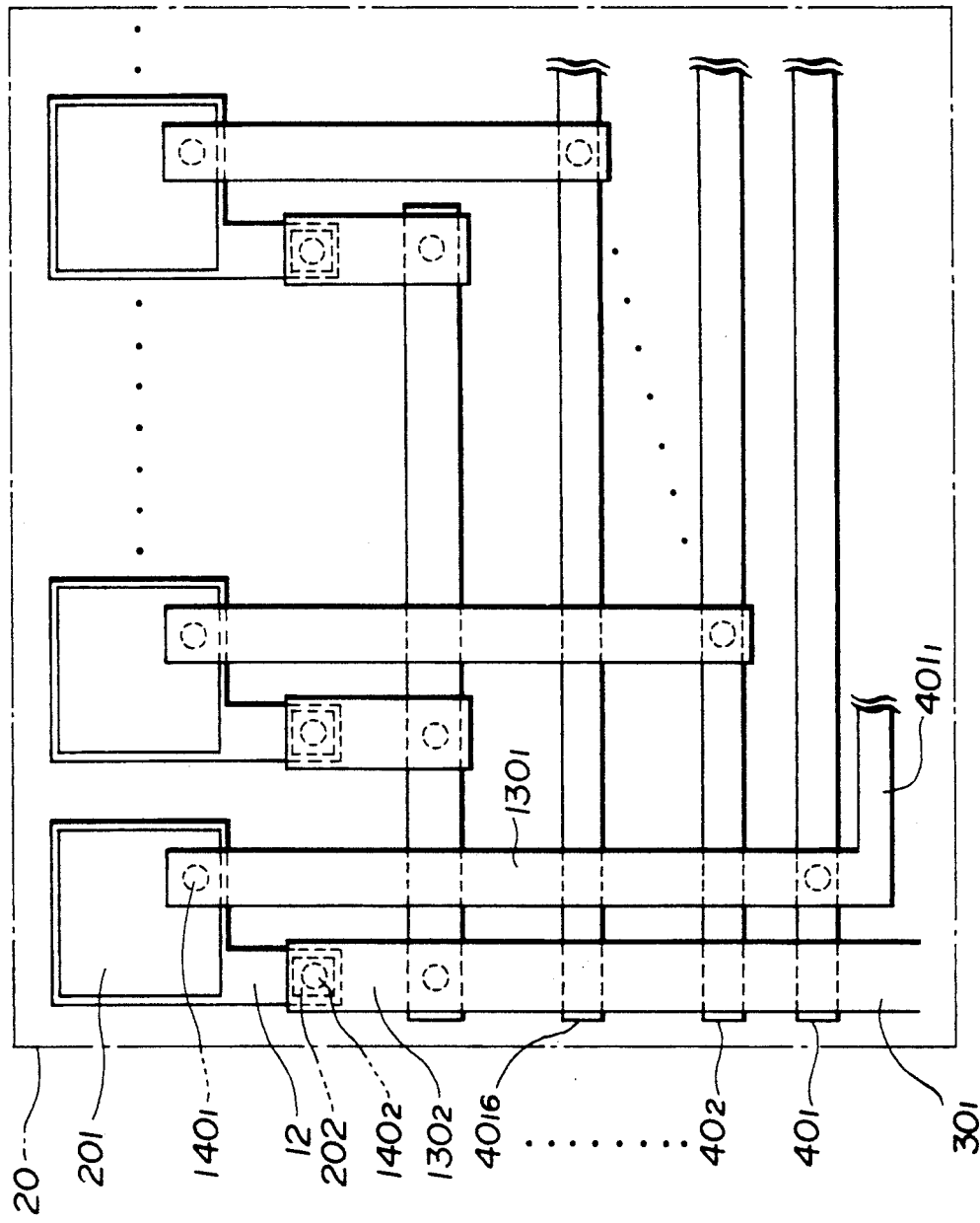
FIG. 8 is a circuit diagram showing a connecting pattern of the sensor elements of the same.

FIG. 7 is a detailed drawing of sensor blocks of a complete-contact type image sensor as a second embodiment of the present invention and FIG. 8 is a diagram showing a connecting pattern of sensor elements of the same. The second embodiment differs from the first embodiment in that, while the upper electrodes $13_1$ and $13_2$ were arranged at both sides of the sensor element 2 in the first embodiment, the upper electrodes $130_1$ and $130_2$ in the present embodiment are arranged at one side of the sensor element 200.

In the sensor element 200 of the second embodiment, the photodiode 201 and the blocking diode 202 are formed such that they are aligned at one side edge as shown in FIG. 8. Further, the contact hole 140₁ for the photodiode 201 and the contact hole 140₂ for the blocking diode 202 are arranged so that they may not be located in one straight line perpendicular to the output line electrode 40, with the contact hole 140₁ formed above the photodiode 201 at its side end portion toward the blocking diode 202.

According to the second embodiment, the led-around portions of the input contact members $3_{1-40}$ (the portions X encircled by dotted line in FIG. 2) can be eliminated and, hence, stray capacitance is reduced. Further, since the length of the glass substrate 1 can be made smaller, cost reduction can be attained. Otherwise, the performance and effect are the same as those of the first embodiment.

What is claimed is:

1. A photoelectric transducer for receiving information recorded in a record medium as an optical signal and for converting the optical signal into an electric signal and outputting the electric signal, comprising:
    a substrate;
    a plurality of sensor elements arranged on said substrate for converting the optical signal into the electric signal;
    a matrix circuit for time-divisionally causing the electric signal to be output from each of element groups into which said sensor elements are divided;
    first conductors respectively connected to corresponding sensor elements of said element groups for extracting via said matrix circuit the electric signal from said corresponding sensor elements of said element groups;
    first electrodes respectively connected to said first conductors for outputting the extracted electric signal, said first electrodes located physically closer to said matrix circuit than to said sensor elements;
    second conductors respectively connected to said element groups for transferring a driving pulse to each sensor element, the driving pulse for causing the electric signal to be extracted from each sensor element of each element group and output on said first electrodes;
    second electrodes respectively connected to said second conductors and disposed at a same side of said plurality of sensor elements as said first electrodes on said substrate; and
    transport means provided above said substrate in confrontation with said sensor elements for transporting a record medium sandwiched between said transport means and said substrate.

2. A photoelectric transducer according to claim 1, wherein a group of electrodes formed of said first and second electrodes are arranged at the side where a record medium is inserted between said transport means and said substrate.

3. A photoelectric transducer according to claim 2, wherein said transducer further includes thermocompression-bonded conductive seals for connection with each of the electrodes arranged in said group of electrodes.

4. A photoelectric transducer for receiving information recorded in a record medium as an optical signal and for converging the optical signal into an electric signal and outputting the electric signal, comprising:
    a substrate;
    a plurality of sensor elements arranged on said substrate for converting the optical signal into the electric signal;
    a matrix circuit for time-divisionally causing the electric signal to be output from each of element groups into which said sensor elements are divided;
    first conductors respectively connected to corresponding sensor elements of said element groups for extracting via said matrix circuit the electric signal from said corresponding sensor elements of said element groups;
    first electrodes respectively connected to said first conductors for outputting the extracted electric signal;
    a group of first electrodes formed of an assembly of said first electrodes;
    second conductors respectively connected to said element groups for transferring a driving pulse to each sensor element without crossing with said first electrodes, the driving pulse for causing the electric signal to be extracted from each sensor element of each element group and output on said said first electrodes;
    second electrodes respectively connected to said second conductors and located at a same side of said plurality of sensor elements as said first electrodes on said substrate;
    a group of second electrodes formed of an assembly of said second electrodes; and
    transport means provided above said substrate in confrontation with said sensor elements for transporting a record medium sandwiched between said transport means and said substrate.

5. A photoelectric transducer according to claim 4, wherein a group of electrodes formed of said first and second electrodes are arranged at the side where a record medium is inserted between said transport means and said substrate.

6. A photoelectric transducer according to claim 4, wherein said transducer further includes thermocompression-bonded conductive seals for connection with each of the electrodes arranged in said group of electrodes.

7. An image sensor for converting an optical signal into an electric signal comprising:
    a substrate;
    a plurality of sensor elements arranged on said substrate for converting the optical signal into the electric signal;
    a matrix circuit for time-divisionally causing the electric signal to be output from each of element groups into which said sensor elements are divided;
    first conductors respectively connected to corresponding sensor elements of said element groups for extracting via said matrix circuit the electric signal from said corresponding sensor elements of said element groups;
    first electrodes respectively connected to said first conductors, said first electrodes located physically closer to said matrix circuit than to said sensor elements;
    second conductors respectively connected to said element groups for transferring a driving pulse to each sensor element, the driving pulse for causing the electric signal to be extracted from said sensor element of each element group and output on said first electrodes; and second electrodes respectively connected to said second conductors and located at a same side of said plurality of sensor elements as said first electrode on said substrate.

8. An image sensor for converting an optical signal into an electric signal comprising:
 a substrate;
 a plurality of sensor elements arranged on said substrate for converting the optical signal into the electric signal;
 a matrix circuit for time-divisionally causing the electric signal to be output from each of element groups into which said sensor elements are divided;
 first conductors respectively connected to corresponding sensor elements of said element groups for extracting via said matrix circuit the electric signal from said corresponding elements of said element groups;
 first electrodes respectively connected to said first conductors for outputting the extracted electric signal;
 a group of first electrodes formed of an assembly of said first electrodes;
 second conductors respectively connected to said element groups for transferring a driving pulse to each sensor element without crossing with said first electrodes, the driving pulse for causing the electric signal to be extracted from each sensor element of each element group and output on said first electrodes;
 second electrodes respectively connected to said second conductors and located at a same side of said plurality of sensor elements as said first electrode on said substrate; and
 a group of second electrodes formed of an assembly of said second electrodes.

* * * * *